(12) United States Patent
Petzoldt et al.

(10) Patent No.: US 9,342,278 B2
(45) Date of Patent: May 17, 2016

(54) METHOD AND PROGRAM EDITOR FOR CREATING AND PROCESSING A PROGRAM FOR AN INDUSTRIAL AUTOMATION ARRANGEMENT

(71) Applicants: Joerg Petzoldt, Stein (DE); Christian Schroeder, Nuremberg (DE)

(72) Inventors: Joerg Petzoldt, Stein (DE); Christian Schroeder, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 59 days.

(21) Appl. No.: 14/190,791

(22) Filed: Feb. 26, 2014

(65) Prior Publication Data

US 2014/0245256 A1    Aug. 28, 2014

(30) Foreign Application Priority Data

Feb. 27, 2013   (EP) ..................................... 13157024

(51) Int. Cl.
| | |
|---|---|
| G06F 9/44 | (2006.01) |
| G05B 19/05 | (2006.01) |
| G06F 3/0486 | (2013.01) |

(52) U.S. Cl.
CPC ................ *G06F 8/34* (2013.01); *G05B 19/056* (2013.01); *G06F 3/0486* (2013.01); *G06F 8/33* (2013.01); *G05B 2219/13144* (2013.01); *G05B 2219/23291* (2013.01)

(58) Field of Classification Search
CPC ........... G06F 8/34; G06F 8/33; G06F 3/0486; G05B 19/056; G05B 2219/13144; G05B 2219/23291

USPC .......................................................... 717/109
See application file for complete search history.

(56) References Cited

U.S. PATENT DOCUMENTS

| | | | | |
|---|---|---|---|---|
| RE38,883 E | * | 11/2005 | Wyard | 715/769 |
| 7,337,409 B2 | * | 2/2008 | Doblmayr | G06F 3/0486 |
| | | | | 715/769 |
| 8,351,713 B2 | * | 1/2013 | Sun | H04N 1/3876 |
| | | | | 348/584 |
| 2006/0048069 A1 | | 3/2006 | Igeta | |
| 2008/0300859 A1 | * | 12/2008 | Chen et al. | 704/7 |
| 2010/0190143 A1 | * | 7/2010 | Gal et al. | 434/322 |
| 2012/0144332 A1 | | 6/2012 | Sola | |

* cited by examiner

Primary Examiner — Anna Deng
(74) Attorney, Agent, or Firm — Cozen O'Connor

(57) ABSTRACT

A method for creating and processing a program includes selecting a new program object of an object type. The new program object is presented as a character string. The program is presented as text and a program object is presented as a character string when the program object is inserted into the program using drag-and-drop. The method also includes moving the selected program object to a target position in the program text. The method further includes examining the target position to determine whether a program object of the same or a compatible object type is present at the target position. If such a target program object is present at the target position, the method also includes replacing the target program object with the selected program object. Otherwise, the method includes inserting the character string representing the selected program object into the text of the program at the target position.

8 Claims, 6 Drawing Sheets

FIG 1
(PRIOR ART)

| | | | | | |
|---|---|---|---|---|---|
| 7 | | □ | <Add> | | |
| 8 | ⬛ | ▼ | InOut | | |
| 9 | ⬛ | □ | var1 | Int | 0 |
| 10 | ⬛ | □ | var2 | Int | 0 |
| 11 | ⬛ | □ | var3 | Int | 0 |
| 12 | ⬛ | □ | var4 | Int | 0 |
| 13 | ⬛ | □ | var5 | Int | 0 |
| 14 | ⬛ | □ | var6 | Int | 0 |
| 15 | ⬛ | □ | var7 | Int | 0 |
| 16 | | □ | <Add> | | |
| 17 | ⬛ | ▼ | Static | | |
| 18 | | □ | <Hinzufügen> | | |
| 19 | ⬛ | ▼ | Temp | | |

| IF... | CASE... OF... | FOR... TO DO... | WHILE... DO... | (*...*) |
|---|---|---|---|---|

```
 1
 2    #var1 := 5;
 3
 4  IF #var2 = #var3 + #var4  THEN
 5      #var2 := #var1;
 6  ELSE
 7      #var2 := #var3; + #var4;
 8  END_IF;
 9
10
11  "Block_1" (cnt:=#var2,
12             Valve:= dword_inout ,
13             Sum:=#var6) ;
14
15
```

FIG 2

| | | | | | |
|---|---|---|---|---|---|
| 7 | | | <Add> | | |
| 8 | | ▼ | InOut | | |
| 9 | | □ | var1 | Int | 0 |
| 10 | | □ | var2 | Int | 0 |
| 11 | | □ | var3 | Int | 0 |
| 12 | | □ | var4 | Int | 0 |
| 13 | | □ | var5 | Int | 0 |
| 14 | | □ | var6 | Int | 0 |
| 15 | | □ | var7 | Int | 0 |
| 16 | | □ | <Add> | | |
| 17 | | ▼ | Static | | |
| 18 | | □ | <Add> | | |
| 19 | | ▼ | Temp | | |

| IF... | CASE... OF... | FOR... TO DO... | WHILE... DO... | (*...*) |

```
1
2    #var1  := 5;
3
4  IF #var2 = #var3 + #var4  THEN
5      #var2 := #var1;
6  ELSE
7      #var2 := #var3; + #var4;
8  END_IF;
9
10
11  "Block_1" (cnt:=#var2,
12             Valve:= dword_inout ,
13             Sum:=#var6) ;
14
15
16
```

FIG 3

| 7 | | <Add> | | |
|---|---|---|---|---|
| 8 | | ▼ InOut | | |
| 9 | | var1 | Int | 0 |
| 10 | | var2 | Int | 0 |
| 11 | | var3 | Int | 0 |
| 12 | | var4 | Int | 0 |
| 13 | | var5 | Int | 0 |
| 14 | | var6 | Int | 0 |
| 15 | | var7 | Int | 0 |
| 16 | | <Add> | | |
| 17 | | ▼ Static | | |
| 18 | | <Add> | | |
| 19 | | ▼ Temp | | |

| IF... | CASE... OF... | FOR... TO DO... | WHILE... DO... | (*...*) |

```
1
2     #var1  := 5;
3
4  ⊟IF #var2 = #var3 + #var4  THEN
5  |    #var2 := #var1;
6  | ELSE
7  |    #var2 := #var3; + #var7;
8  ⊦END_IF;
9
10
11 ⊟"Block_1" (cnt:=#var2,
12 |          Valve:= dword_inout ,
13 ⊦          Sum:=#var6) ;
14
15
16
```

FIG 4
(PRIOR ART)

| 7 | | □ | <Add> | | |
|---|---|---|---|---|---|
| 8 | ▨ | ▼ | InOut | | |
| 9 | ▨ | □ | var1 | Int | 0 |
| 10 | ▨ | □ | var2 | Int | 0 |
| 11 | ▨ | □ | var3 | Int | 0 |
| 12 | ▨ | □ | var4 | Int | 0 |
| 13 | ▨ | □ | var5 | Int | 0 |
| 14 | ▨ | □ | var6 | Int | 0 |
| 15 | ▨ | □ | var7 | Int | 0 |
| 16 | | □ | <Add> | | |
| 17 | ▨ | ▼ | Static | | |
| 18 | | □ | <Add> | | |
| 19 | ▨ | ▼ | Temp | | |

| IF... | CASE... OF... | FOR... TO DO... | WHILE... DO... | (*...*) |

```
 1
 2    #var1 := 5;
 3
 4  IF #var2 = #var3 + #var4  THEN
 5      #var2 := #var1;
 6  ELSE
 7      #var2 := #var3 + #var4;
 8  END_IF;
 9
10
11  "Block_1" (cnt:= in   in
12             Valve:= word_inout  ,
13             Sum:= #var6) ;
14
15
16
```

FIG 5

| 7  |   | <Add>      |     |   |
|----|---|------------|-----|---|
| 8  |   | InOut      |     |   |
| 9  |   | var1       | Int | 0 |
| 10 |   | var2       | Int | 0 |
| 11 |   | var3       | Int | 0 |
| 12 |   | var4       | Int | 0 |
| 13 |   | var5       | Int | 0 |
| 14 |   | var6       | Int | 0 |
| 15 |   | var7       | Int | 0 |
| 16 |   | <Add>      |     |   |
| 17 |   | Static     |     |   |
| 18 |   | <Add>      |     |   |
| 19 |   | Temp       |     |   |

| IF... | CASE... OF... | FOR... TO DO... | WHILE... DO... | (*...*) |

```
1
2    #var1  := 5;
3
4  ┌IF #var2 = #var3 + #var4  THEN
5  │   #var2 := #var1;
6  │ELSE
7  │   #var2 := #var3; + #var4;
8  └END_IF;
9
10
11 ┌ "Block_1" (cnt:=| int   in  |
12 │              Valve:= dword inout  ,
13 └              Sum:=#var6) ;
14
15
16
```

FIG 6

| 7 | | □ | <Add> | | |
|---|---|---|---|---|---|
| 8 | | ▼ | InOut | | |
| 9 | | □ | var1 | Int | 0 |
| 10 | | □ | var2 | Int | 0 |
| 11 | | □ | var3 | Int | 0 |
| 12 | | □ | var4 | Int | 0 |
| 13 | | □ | var5 | Int | 0 |
| 14 | | □ | var6 | Int | 0 |
| 15 | | □ | var7 | Int | 0 |
| 16 | | □ | <Add> | | |
| 17 | | ▼ | Static | | |
| 18 | | □ | <Add> | | |
| 19 | | ▼ | Temp | | |

| IF... | CASE... OF... | FOR... TO DO... | WHILE... DO... | (*...*) |

```
 1
 2     #var1  := 5;
 3
 4  IF #var2 = #var3 + #var4  THEN
 5     #var2 := #var1;
 6  ELSE
 7     #var2 := #var3; + #var7 ;
 8  END_IF;
 9
10
11  "Block_1" (cnt:=#var2,
12             Valve:= dword_inout ,
13             Sum:=#var6) ;
14
15
16
```

METHOD AND PROGRAM EDITOR FOR CREATING AND PROCESSING A PROGRAM FOR AN INDUSTRIAL AUTOMATION ARRANGEMENT

CROSS-REFERENCE TO RELATED APPLICATIONS

This application claims priority to European Patent Application No. EP 13157024, filed on Feb. 27, 2013, which is hereby incorporated in its entirety by reference.

FIELD OF THE INVENTION

The invention relates to a method for a graphical user interface of a program editor of an industrial automation arrangement and a program editor for creating and processing a program presented as text for an industrial automation arrangement.

DESCRIPTION OF THE RELATED ART

Programs for industrial automation arrangement (e.g., Programmable Logic Controller, or PLC) are still often created and processed as a text file. Such text-based programs still use program editors with graphical user interface and functionality that substantially correspond to the conventional word processing programs (also known as "word processors").

For example, users of the conventional program editors use known manipulation means (e.g., mouse, track-pad) in addition to the keyboard as input devices. In particular, drag-and-drop technique is often used as an operating procedure. For instance, frequently used elements, such as "library objects" (also referred to as "program objects"), are presented in a separate window (frame or area) and are copied to a selected place in the automation program using drag-and-drop. As in conventional word processing programs in which a complete word can be selected (marked) by double-clicking on a character of the word to be cut and pasted (i.e., dragged and dropped), for example, program objects can be also selected from a library or another program part as a complete character string to be dragged and dropped.

However, disadvantages related to the conventional dragging and dropping of program objects include that, on one hand, the target position must be very accurately indicated (e.g., between two letters, numbers or other characters) using the manipulation means (e.g., mouse pointer) and, on the other hand, if the program object manipulated in this manner (e.g., being dragged to be dropped) is intended to replace another program object, this other program object must be either previously deleted, or at least pre-marked. With the multiplicity of processing steps which are regularly needed to create a complex automation program, there is a long-felt need for a more ergonomic program-editor that can make the corresponding work sequence faster and/or simpler. An object of the invention of making the use of conventional program editors more ergonomic accordingly results to meet the long-felt need.

SUMMARY OF THE INVENTION

A core idea of the achievement of this object according to the invention is to process the text blocks or character strings selected during a drag-and-drop as a logical program object with an associated object type, in which case the target position is examined in order to determine whether there is already another program object there which can be replaced with the manipulated ("dragged") program object. This can be assumed, in particular, when both program objects involved either have the same object type, or at least have an object type compatible with each other (command, variable, operator, etc.). One advantageous refinement involves allowing a user to choose, during each work step, whether an existing program object is intended to be replaced, or whether the character string representing the "dragged" program object is only intended to be copied, or inserted, into the existing text (program) at the place of the target position. The object can be achieved, in particular, by a method according to independent claim 1 and by a program editor according to independent claim 8.

In one embodiment, a method for a graphical user interface of a program editor of an industrial automation arrangement includes selecting a program object of an object type using an input means and moving the selected program object to a target position. A program is presented as text and program objects are presented as character strings that can be inserted into the program using a drag-and-drop technique. The method also includes examining the target position to determine whether an existing program object at the target position (i.e., target program object) is of the same, or a compatible, object type as the selected program object and, if the target program object is of the same or a compatible object type as the selected program object, the target program object is replaced with the selected program object. If, however, the target program object is not of the same or a compatible object type as the selected program object, the character string representing the selected program object is inserted into the text of the program at the target position. Such a method makes it possible to ergonomically operate a program editor, in which case, in particular, the previous separate steps of replacing a program object can be omitted or carried out automatically.

In another embodiment, a program editor for creating and processing a program presented as text for an industrial automation arrangement is configured to insert a program object presented as a character string into the program using a drag and drop technique. More specifically, the program editor is configured to support an operating procedure that includes selecting a new program object of an object type that is presented as a character string using an input means and moving the selected program object to a target position in the text of the program. The operating procedure also includes examining the target position to determine whether an existing program object at the target position (target program object) is of the same or a compatible object type as the selected program object and, if it is determined that the target program object is of the same or a compatible object type as the selected program object, replacing the target program object with the selected program object. The operating procedure further includes inserting the character string representing the selected program object into the text of the program at the target position, if it is determined that the target program object is not of the same, or a compatible, object type as the selected program object. Such a program editor can be used to achieve the advantages discussed in the context of the above-described method.

Advantageous refinements of one embodiment of the method are stated in the claims that depend from independent claim 1. The features and their advantages described in the method claims may also analogously apply to one or more embodiments of the program editor according to the invention. The features of the advantageous refinements can be implemented both individually and in combination with one another.

In one embodiment that includes an advantageous refinement, a user is provided with an option to select whether the target program object is to be replaced using the operating procedure or whether the character string denoting the selected program object is intended to be copied to the target position after the first step of selecting and moving a program object is performed. This can be achieved, for example, by virtue of the fact that the last action (i.e., the insertion of the character string at the "cursor position") is initially intended to be carried out if the user immediately carries out the "drop" action (i.e., dropping of the program object), but, otherwise, the program object that is already at the target position is marked after a short waiting time (e.g., one second), and in that case subsequent dropping is intended to result in the target program object being replaced with the selected program object. In any case, in one advantageous refinement, the program object found at the target position can be highlighted (marked, inverted or the like). In the event that an attempt is made to replace a target program object with a selected program object of an unsuitable (i.e., incompatible) object type, a warning signal, an error message or the like may be output; alternatively, the carrying-out of the process can also be automatically interrupted.

A program can be quickly processed if the new program object is selected from a number of available program objects, for example from a library or from another program that is used as a template, and is copied/inserted into the program using the described drag-and-drop operating procedure. If the goal is copying a program object rather than moving a program object, the two operating modes can be distinguished by pressing a control key or the like on a computer keyboard during copying and not pressing a key during shifting/moving, or vice versa.

In one embodiment that includes an advantageous refinement, a current operating mode of the program editor is taken into account, and only those target program elements of the same or a compatible object type that are intended to be processed in the current operating mode can be replaced in the replacing step of the method. This is appropriate, for example, if program objects from an older program (template) are intended to be adopted in a newer program. If the program editor is in the "parameterize" operating mode, for example, only parameters (variables, constants, numbers) can be selected in the older program (template) and moved to an appropriate place in the target program using "drag-and-drop," in which case such an appropriate place may be a placeholder for parameters, in particular. It is accordingly also possible to make the "capture range" (i.e., the permitted distance between the actual target position of a mouse pointer and a possible target position), correspondingly large, thus resulting in more fluid working/processing.

In one embodiment that includes an advantageous refinement, the described operating mode can also be automatically determined using the object type of the selected program object at the beginning of the operating procedure. If appropriate, the operating mode can also be selected in a semi-automatic manner by operating a control key while any desired program object of the desired object type is selected, after which the operating mode is set up in accordance with the selected object type. In another embodiment that includes an advantageous refinement, the object type of a selected program object is determined from the object type associated with the corresponding program library (i.e., the corresponding object type is associated, for example, when selecting a program object from an instruction library), whereas, when selecting a variable from a list of variables, it is clear that an object type suitable for parameterizing instructions and the like is associated with the selected character string.

BRIEF DESCRIPTION OF THE DRAWINGS

Exemplary embodiments of methods according to the invention are explained below using the drawings. They are simultaneously used to explain exemplary embodiments of program editors according to the invention. In the drawings:

FIG. 1 shows a drag-and-drop operating procedure according to the prior art, FIGS. 2-3 show the practice of copying a program object in accordance with the disclosed subject matter, FIG. 4 shows another operating procedure according to the prior art, and FIGS. 5-6 show the further operating procedure according to in accordance with the disclosed subject matter.

DETAILED DESCRIPTION OF THE PREFERRED EMBODIMENTS

FIG. 1 illustrates a part of a user interface of a conventional program editor in the prior art. In this case, a list of variables containing variables var1, . . . , var7 of the "integer" type can be seen in the upper half of FIG. 1, in which case one of the variables is intended to be inserted into a section of a program (e.g., automation program) illustrated in the lower half of FIG. 1. This operation is illustrated using an arrow which symbolizes a known drag-and-drop operating procedure. The same starting configuration, i.e., the same list of variables as a "library" in the upper half of the respective figure and the same piece of program code in the lower half of the respective figure, applies to FIGS. 2-6 described below.

As mentioned, FIG. 1 illustrates the prior art, which can be seen from the fact that the selected character string "var7" is dragged into the text of the program using the operating procedure, to be precise specifically in the middle of the character string "#var4". The symbol "+" at the insertion mark is used to symbolize that the character string "var7" is intended to be copied to precisely the marked place, which, in the prior art (not illustrated), would result in the resultant character string being "#vvar7ar4", which would be, however, a nonsensical instruction in the syntax of the programming language.

FIG. 2 illustrates the inventive method of operation of the same operating procedure which was previously discussed using FIG. 1. In this case, the program editor in operation has determined that a program object of the type "variable of the integer type" is present at the insertion mark inside the character string "#var4". The marked and shifted object "var7" is of the same type, with the result that the character string "var4" is accordingly automatically marked (illustrated in the figure by means of a square frame), in which case the existing program object "#var4" automatically marked in this manner is replaced with the moved program object "var7" in the next step. In accordance with the marking by means of the character "#", which identifies the existing program object "var4" as an instance of a variable, the newly inserted program object is also identified as an instance of a variable, that is to say is identified with the character "#". The result is illustrated in FIG. 3.

In the previously discussed example, an existing program object has been replaced with such a new program object of the same object type (namely a variable of the integer type). However, object types which are compatible with one another can also be replaced; for example, in a floating-point operation which uses operands of the "real" type, an existing variable of the "real" type can be replaced with a new variable of the "integer" type. This means that the program editor according to the invention evaluates the context of the program object to be replaced, that is to say the type of arithmetic operation (here: floating-point arithmetic) in this case. FIG. 4 shows the section of the user interface which is already known from FIG. 1, but, in contrast to the illustration in FIG. 1, the variable "var2" is dragged into the assignment "cnt:=int_in" from the "library part" in the upper half of FIG. 4 in this further exemplary embodiment. According to the prior art, the character string "var2" would now be copied into the existing character string, with the result that a resultant character string "cnt:=invar2t_in" would result at this place, which would be a syntactically incorrect instruction.

The state in which the character string "int_in" has been automatically marked because this character string has been recognized as a placeholder ("input variable of the integer type") for the parameterization of the variable "cnt" can be seen as the inventive result of the operating action in FIG. 5, in which case the program object "var2" has been recognized as a program object of a suitable object type for parameterization. Accordingly, the automatically marked placeholder is completely replaced with an instance of the selected and moved variable "var2", which can be discerned in FIG. 6 at the corresponding target position from the character string "#var2".

As a result of the method described above and the program editor also defined thereby, text blocks are understood as objects in drag-and-drop operations. As a result of the operating procedure involving the drag-and-drop of objects, the pure text (for example designator or name of the object) is not used, but rather the respective object itself. The context is noted in the program editor in this case. If the user drags an object onto an existing object, this is completely replaced in terms of text. Nevertheless, it is possible for a user to also still use the procedure from the prior art in which the system initially offers, for example, the insertion of text (as usual), but then carries out the context-sensitive detection of the target program object after a short delay. A "frame" comprising the underlying, existing program object, for example, is therefore pulled up from an indicator (for example a "mouse pointer") after a short delay in the drag-and-drop operating procedure. For the user or programmer, this is an indication that variables in his program or other program objects are now completely replaced. This makes it possible to operate planning software or generally a program editor in a more efficient manner.

Although the present invention has been described above with reference to preferred exemplary embodiments, it is not limited thereto but rather can be modified in a wide variety of ways. In particular, the invention can be altered or modified in multifarious ways without departing from the essence of the invention.

What is claimed is:

1. A method for creating and processing a program for a programmable logic controller (PLC) using a graphical user interface of a program editor of the PLC, wherein the program is presented as text and a program object is presented as a character string when the program object is inserted into the program using drag-and-drop, the method comprising the steps of:
   selecting a new program object of an object type using an input manipulation at the PLC, wherein the new program object is presented as a character string;
   moving the selected new program object to a target position in the text of the program;
   examining the target position to determine whether an existing program object of one of the same object type and a compatible object type is present at the target position;
   replacing the existing program object with the selected new program object when it is determined that the existing program object of one of the same object type or a compatible object type is present; and
   inserting the character string representing the selected new program object into the text of the program at the target position upon determining that the existing program object of one of the same object type or a compatible object type is not present.

2. The method of claim 1, further comprising, after the selecting and moving steps are performed, a step of providing an option for a user to select for performing one of the replacing step and the inserting step.

3. The method of claim 1, wherein, when the examining step determines that the existing program object of one of the same object type and a compatible object type is present, the existing program object to be replaced is highlighted on the graphical user interface using a mark.

4. The method of claim 1, wherein the new program object is selected from a number of program objects presented using a library and copied into the program using a drag-and-drop operation.

5. The method of claim 1, wherein a current operating mode of the program editor of the PLC is detected, and wherein only existing program elements of the object type that are intended to be processed under the current operating mode become available for the replacing step.

6. The method of claim 5, wherein the current operating mode is automatically detected using the object type of the program object selected in the selecting step.

7. The method of claim 5, wherein a distinction is made at least between an operating mode for expanding the program and an operating mode for parameterizing the program.

8. A program editor of a programmable logic controller (PLC) includes a processor for creating and processing a program presented as text for the PLC, the program editor of the PLC being configured to insert a program object presented as a character string into the program using drag-and-drop, and the program editor of the PLC being configured to support an operating procedure comprising the steps of:
   selecting, using an input manipulation at the PLC, a new program object of an object type that is presented as a character string;
   moving the selected new program object to a target position in the text of the program;
   examining the target position to determine whether an existing program object of one of the same object type and a compatible object type is present at the target position;
   replacing the existing program object with the selected new program object when it is determined that an existing program object of one of the same object type and a compatible object type is present at the target position; and
   inserting the character string representing the selected new program object into the text of the program at the target position upon determining that an existing program object of one of the same object type and a compatible object type is not present at the target position.

* * * * *